United States Patent
Pesi

(10) Patent No.: US 12,523,889 B2
(45) Date of Patent: Jan. 13, 2026

(54) CONTACT LENS

(71) Applicant: Leonardo Vision S.r.l., Montecatini Terme (IT)

(72) Inventor: Leonardo Pesi, Montecatini-Terme (IT)

(73) Assignee: LEONARDO VISION S.R.L., Montecatini Terme (IT)

( * ) Notice: Subject to any disclaimer, the term of this patent is extended or adjusted under 35 U.S.C. 154(b) by 489 days.

(21) Appl. No.: 17/792,563

(22) PCT Filed: Jan. 12, 2021

(86) PCT No.: PCT/IT2021/050007
§ 371 (c)(1),
(2) Date: Jul. 13, 2022

(87) PCT Pub. No.: WO2021/144820
PCT Pub. Date: Jul. 22, 2021

(65) Prior Publication Data
US 2023/0053359 A1   Feb. 23, 2023

(30) Foreign Application Priority Data

Jan. 14, 2020   (IT) .................. 102020000000571

(51) Int. Cl.
*G02C 7/04* (2006.01)
*A61F 2/14* (2006.01)

(52) U.S. Cl.
CPC .............. *G02C 7/04* (2013.01); *A61F 2/145* (2013.01)

(58) Field of Classification Search
CPC .......... G02C 7/04; G02C 7/049; G02C 7/047; A61F 2/145
See application file for complete search history.

(56) References Cited

U.S. PATENT DOCUMENTS

| | | | | |
|---|---|---|---|---|
| 3,228,741 | A | * 1/1966 | Becker | G02C 7/04 351/159.04 |
| 4,055,378 | A | * 10/1977 | Feneberg | C08J 7/18 264/2.6 |
| 5,044,742 | A | 9/1991 | Cohen | |
| 5,286,338 | A | * 2/1994 | Feldblum | C03C 15/00 252/79.1 |
| 7,878,650 | B2 | 2/2011 | Fritsch et al. | |
| 2003/0117576 | A1 | * 6/2003 | Thakrar | G02C 7/046 351/159.66 |

(Continued)

FOREIGN PATENT DOCUMENTS

| GB | 1173515 A | 12/1969 |
|---|---|---|
| WO | 0227388 A1 | 4/2002 |

OTHER PUBLICATIONS

Int'l Search Report and Written Opinion issued Apr. 9, 2021 in Int'l Application No. PCT/IT2021/050007.

*Primary Examiner* — William R Alexander
*Assistant Examiner* — Gabriel A Sanz
(74) *Attorney, Agent, or Firm* — Panitch Schwarze Belisario & Nadel LLP

(57) ABSTRACT

Contact lens that, during use, creates a hollow space between its concave internal surface and the convex external surface of the eye and contacts the corneal epithelium only for a fraction of its internal surface facing toward the eye thanks to the presence of a plurality of micro-protuberances which allow to raise the contact lens by a few micrometers with respect to the corneal surface.

12 Claims, 3 Drawing Sheets

(56) References Cited

U.S. PATENT DOCUMENTS

| | | | |
|---|---|---|---|
| 2006/0291064 A1* | 12/2006 | Yao | G02B 5/0268 |
| | | | 359/619 |
| 2012/0242951 A1* | 9/2012 | Roffman | G02C 7/047 |
| | | | 351/159.05 |
| 2015/0153588 A1 | 6/2015 | Angelini et al. | |
| 2018/0045863 A1* | 2/2018 | Bookbinder | G02B 6/0038 |
| 2019/0075789 A1* | 3/2019 | Yee | B29C 59/022 |
| 2021/0271109 A1* | 9/2021 | Yao | G02C 7/046 |

* cited by examiner

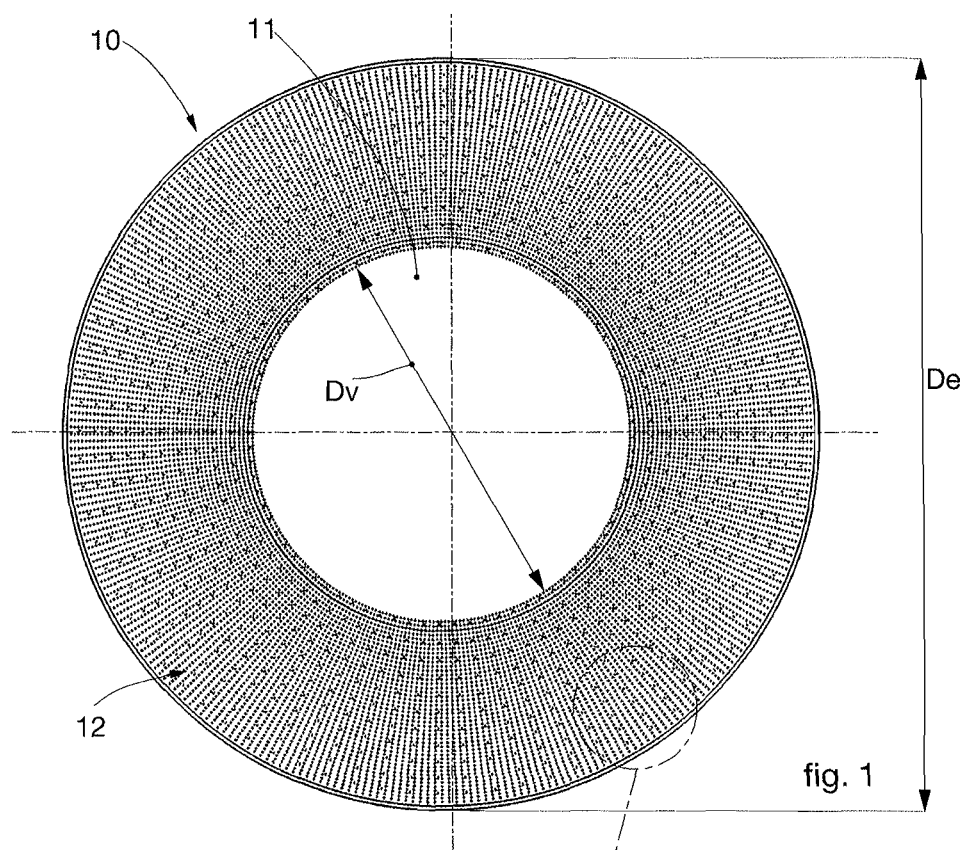
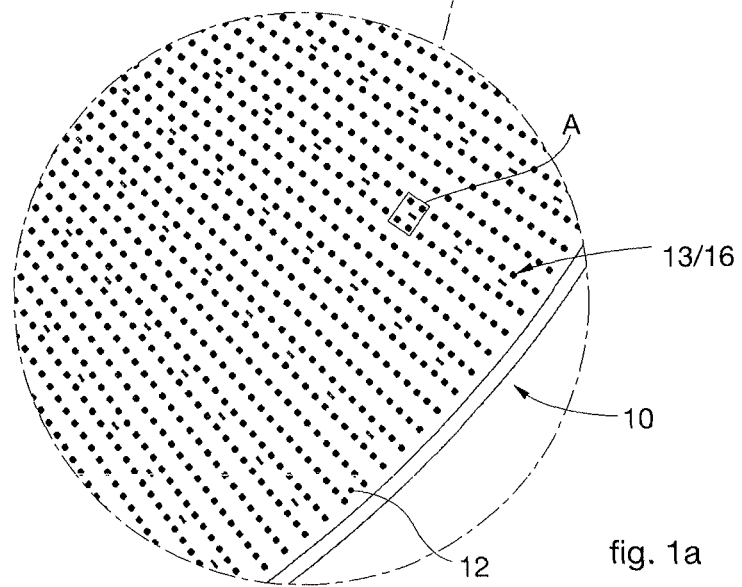
fig. 1
fig. 1a

CONTACT LENS

CROSS-REFERENCE TO RELATED APPLICATIONS

This application is a Section 371 of International Application No. PCT/IT2021/050007, filed Jan. 12, 2021, which was published in the English language on Jul. 22, 2021, under International Publication No. WO 2021/144820 A1, which claims priority under 35 U.S.C. § 119 (b) to Italian Application No. 102020000000571, filed Jan. 14, 2020, the disclosures of each of which are incorporated herein by reference.

FIELD OF THE INVENTION

Embodiments described here concern a contact lens intended to compensate for the most common sight defects such as myopia, hyperopia, astigmatism and presbyopia.

BACKGROUND OF THE INVENTION

It is known that there are currently various types of contact lenses, substantially classified into the following two main categories:
 soft contact lenses;
 rigid gas permeable contact lenses (RGP).

Soft contact lenses are the most common, they adapt more easily to the cornea, they remain stable in the position of use in any condition, and are characterized by the presence, in their structure, of an aqueous component, indicatively variable between 36% and 65% by volume.

The presence of the hydrophilic material allows the soft contact lens to absorb the tear film, creating a "sponge effect", facilitating the passage of oxygen from the front surface of the lens to the rear surface of the lens and thus nourishing the cornea.

On the other hand, if the soft contact lens is not adequately and continuously wet by the tear film, it tends to dry out, triggering a process of dehydration and poor nourishment of the cornea.

Another disadvantage is that the drying of soft contact lenses makes the material less soft and causes a reduction in the value of the base radius of the lenses themselves (which are narrower), thus making them much less comfortable to wear.

The hydrophilic characteristic of soft contact lenses also entails the retention of bacteria, viruses and various dirt inside the lens itself, and this can cause various and serious eye infections.

In short, soft contact lenses can compensate for almost all visual ametropias but are particularly indicated in the case of good or excellent tearing and require careful cleaning.

The other category of contact lenses is represented by rigid gas permeable lenses (RGP) which have the characteristic of not being as flexible as soft lenses and, therefore, always maintain their shape once put in.

This particularity allows excellent quality of sight even in the case of corneal irregularities.

RGP contact lenses consist of hydrophobic materials that prevent the "sponge effect" typical of soft contact lenses, and allow the tear film, held between their rear surface and the front surface of the cornea, a better oxygenation of the cornea itself.

Furthermore, RGP contact lenses, once put in, are not completely in contact with the corneal epithelium, but float on the surface created by the layer of tear film, all in all obtaining greater respect for the physiological environment of the eye.

Moreover, RGP contact lenses, having reduced wettability, are better from a hygienic point of view, given that they do not absorb and do not let through the extraneous substances that are deposited on their surface, reducing the risks of infection.

The main disadvantage of RGP contact lenses, however, is that they are made of a rigid material and this leads to less tolerability and comfort, especially when they are first used, compared to soft contact lenses.

In short, RGP contact lenses can compensate for almost all visual ametropias, they are indicated in the case of an irregular cornea and even in cases of medium tearing, but they are not very comfortable.

Some solutions have been proposed. For example, document U.S. Pat. No. 5,044,742 describes a contact lens on the internal surface of which disk-shaped protuberances are provided, which form cavities with the purpose of containing the tear film in order to increase its quantity between the lens and the eye.

Document GB1173515 shows a contact lens provided, on its surface facing the eye, with annular-shaped protuberances of millimeter sizes, in order to retain large quantities of tear film. However, these annular protuberances alter the normal distribution of the tear film.

US2015/153588 describes a lens with nano-protuberances on the internal surface, the purpose of which is to increase the lubrication of silicone hydrogel lenses.

U.S. Pat. No. 7,878,650 shows a lens with hemispherical protuberances on its internal surface, to be used under water, and which has the ability to resist the trapping of microbes on the surface of the eye covered by the lens, to reduce the probability of microbial infection of the eye. The lens in this document can therefore be worn for extended periods of time, particularly in an aquatic environment.

The above solutions do not fully satisfy the needs of the sector.

There is therefore a need to perfect a contact lens which can overcome at least one of the disadvantages of the state of the art.

In particular, one purpose of the present invention is to provide a contact lens which is similar to the soft contact lenses currently known, so as to adapt to the conformation of the cornea, improving tolerability and comfort of use, in any condition whatsoever.

Another purpose of the present invention is to provide a non-hydrophilized contact lens which, once put in, allows the tear film to remain constantly inside the gap that is created between the cornea and the lens itself, without being absorbed (no "sponge effect"), in a similar but better way than what happens with known RGP contact lenses, keeping tearing in its natural state.

Yet another purpose is to provide a contact lens which, once put in, allows the tear film to move freely between the cornea and the lens, at least during eye movements or blinking of the eyelids.

One purpose of the present invention is also to provide a contact lens which does not allow any possible extraneous external agents to pass through its surface, drastically reducing the risk of infections and simplifying ordinary maintenance.

Finally, one purpose of the present invention is to provide a contact lens which has production costs that are comparable to if not lower than those of known contact lenses.

In short, one purpose of the present invention is to provide a contact lens that allows to combine all the advantages of the contact lenses currently available on the market, that is, soft contact lenses and rigid gas permeable (RGP) contact lenses described above, without being characterized by the relative disadvantages, drastically reducing the problems caused by current lenses.

The Applicant has devised, tested and embodied the present invention to overcome the shortcomings of the state of the art and to obtain these and other purposes and advantages.

SUMMARY OF THE INVENTION

The present invention is set forth and characterized in the independent claim. The dependent claims describe other characteristics of the present invention or variants to the main inventive idea.

In accordance with the above purposes, a contact lens made of non-hydrophilized material, which as a whole has a concave shape, comprises an internal, circumscribed and completely smooth surface in which there are defined an internal zone and a concave peripheral zone, which is completely outside the internal zone. Both these zones, during use, are facing toward the eye.

The contact lens comprises a plurality of micro-protuberances facing, during use, toward the eye that allow to raise the lens by a few micrometers, for example by an amount comprised between 7 and 10 microns, with respect to the corneal surface.

According to some embodiments of the lens, the micro-protuberances are disposed within the limits of the peripheral zone as above, only.

These micro-protuberances are formed by a base, joined to the lens, in particular departing from its internal surface, which extends in height toward a top, conformed to remain in contact with the corneal epithelium.

According to one variant, inside the peripheral zone the contact lens can also comprise a plurality of holes, interspersed with the micro-protuberances.

Advantageously, the contact lens has a reduced thickness compared to the lenses currently comprised in the state of the art.

Thanks to the presence of the micro-protuberances, and/or the possible presence of the holes, and thanks to having a reduced thickness and being made of a non-hydrophilized material, it is possible to overcome the limits of the state of the art and eliminate the defects present therein.

In particular, a contact lens is obtained that does not alter the natural and physiological hydration and nourishment of the cornea, with a high level of comfort, in any condition of use whatsoever, with a very low risk of infections for the eye and with simple routine maintenance.

Furthermore, the manufacturing costs are comparable with those of the contact lenses belonging to the state of the art.

Furthermore, the contact lenses in question are characterized by a medium-low surface contact angle, comprised between 10° and 60°. Advantageously, this surface contact angle allows on the one hand to obtain a lens in which fluids can easily move through the spaces defined between the micro-protuberances and, on the other hand, to reduce the friction between the lens and the eyelids to a minimum, so as to make available to the user a lens that is very comfortable to use.

BRIEF DESCRIPTION OF THE DRAWINGS

These and other aspects, characteristics and advantages of the present invention will become apparent from the following description of some embodiments, given as a non-restrictive example with reference to the attached drawings wherein:

FIG. 1 is a top plan view of the concave part of a contact lens according to embodiments described here;

FIG. 1a shows an enlarged detail of a portion of the peripheral zone of the contact lens of FIG. 1;

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 2B:
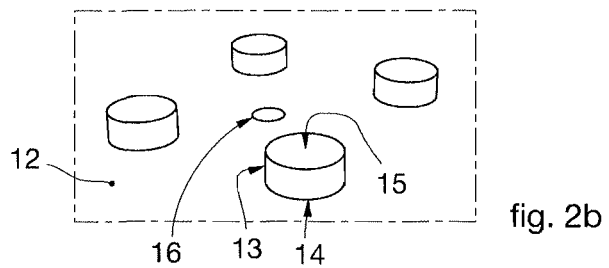
FIGS. 2a, 2b and 2c are enlarged perspective views of the detail A shown in FIG. 1a, according to possible embodiments.

We will now refer in detail to the possible embodiments of the invention, of which one or more examples are shown in the attached drawings. Each example is supplied by way of illustration of the invention and shall not be understood as a limitation thereof. For example, one or more characteristics shown or described insomuch as they are part of one embodiment can be varied or adopted on, or in association with, other embodiments to produce further embodiments. It is understood that the present invention shall include all such possible modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

The attached drawings are used to describe some embodiments of a contact lens, indicated with reference number 10.

With reference to FIG. 1, the contact lens 10, according to the present invention, comprises an internal zone 11 which extends within a visual diameter Dv, which is smaller than an external diameter De of the contact lens 10. This internal zone 11 is smooth and faces, during use, the eye.

Advantageously, in all the embodiments described hereafter and shown in the attached drawings, the contact lens 10 is manufactured with a combination of non-hydrophilic, biocompatible polymeric materials known in the state of the art, such as for example Poly(methyl acrylate) (PMA).

The contact lens 10 has, as a whole, a concave shape, and therefore the internal zone 11 also has this same concave shape.

Here and throughout this description, the term "smooth" is intended to connote the surface finish of this internal zone 11, which on one side has a high degree of smoothness, with a surface finish that makes it suitable for contact with the eye, and on the other side is completely devoid of any protuberance whatsoever that projects toward the eye starting from the surface of the internal zone.

The visual diameter Dv is preferably identified by the maximum size of the projection of the outline relating to the maximum dilation of the pupil on the concave surface, facing the eye, of the contact lens 10.

With reference to the human eye and according to a preferential embodiment, the internal zone 11 is identified by a circumference of diameter Dv concentric to the circumference of diameter De.

The visual diameter Dv has a maximum value indicatively equal to 8 mm, and a typical preferential value of this is between 4.5 and 5 mm, while the external diameter De of the contact lens 10 is indicatively comprised between 9 and 13 mm.

Furthermore, the contact lens 10 comprises a peripheral zone 12, completely outside the internal zone 11 and, therefore, completely outside the visual diameter Dv, and which extends, at most, up to the external diameter De. This peripheral zone 12, of annular shape, extends between the visual diameter Dv and the external diameter De, being configured as a natural continuation of the internal zone 11; for this reason, the peripheral zone 12 also generally has a concave shape.

Figure 2A:
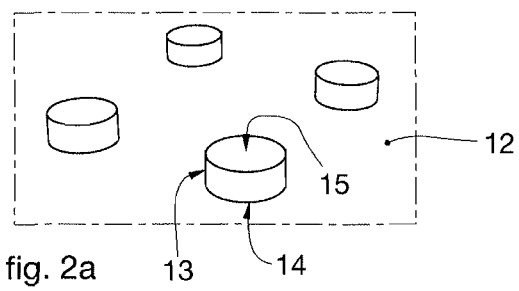

According to one variant, visible in the enlargement of FIG. 2a, the contact lens 10 comprises exclusively a plurality of micro-protuberances 13, disposed so as to be facing, during use, toward the eye.

According to some embodiments described here, these micro-protuberances 13, which can also be called "pillars" or "micro-pillars", are made in the peripheral zone 12.

According to a preferential embodiment, the micro-protuberances 13 are provided on the entire internal surface of the peripheral zone 12 and are disposed starting from the visual diameter Dv up to the external diameter De.

Preferably, the micro-protuberances 13 are homogeneously distributed over the entire internal surface of the peripheral zone 12, for example according to a geometric pattern defined by a plurality of rows which radially depart from the center of the contact lens 10.

The micro-protuberances 13 advantageously comprise a base 14, connected to the peripheral zone 12 of the contact lens 10, and a top 15, configured and conformed to rest on, and to remain in contact with, the cornea of the eye. Advantageously, the micro-protuberances 13 are integrated in a single body with the contact lens 10, since they are made in a single piece with the latter and of the same material.

Figure 3A:
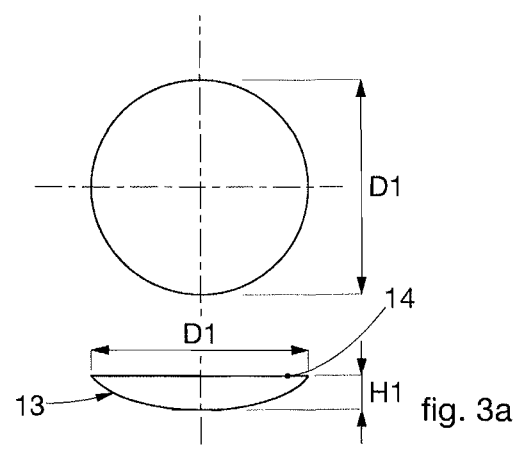
FIGS. 3a, 3b, 3c and 3d show a detail of the contact lens, according to possible embodiments.
Figure 3B:
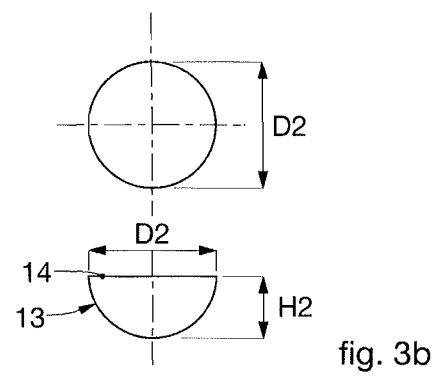
Figure 3C:
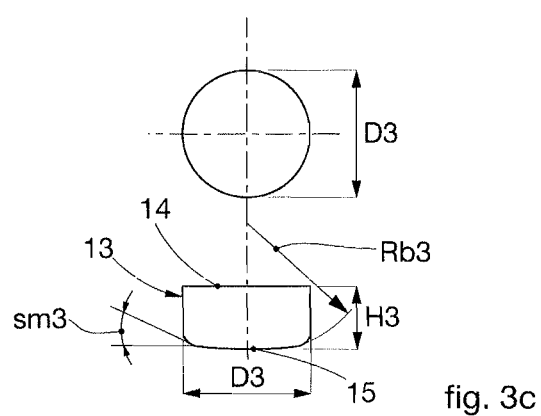
Figure 3D:
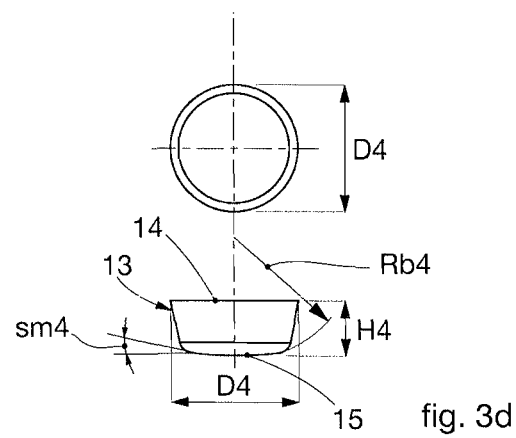

According to some preferential embodiments, in a non-limiting manner and with particular reference to FIGS. 3a, 3b, 3c and 3d, the micro-protuberances 13 have a spherical cap configuration (FIG. 3a), or a configuration according to a hemispherical shape (FIG. 3b), or also a configuration according to a cylindrical shape (FIG. 3c), or a configuration according to a truncated cone shape (FIG. 3d).

In other possible, non-preferential embodiments, the micro-protuberances 13 have an ellipsoidal, paraboloid or prismatic shape, for example, they are shaped as a parallelepiped, a truncated pyramid or a polyhedron in general.

It should be noted that in the examples shown in the drawings, the micro-protuberances have a symmetrical configuration, but micro-protuberances with an asymmetrical configuration can also be provided. This applies to any shape whatsoever that can be given to the micro-protuberances.

In any case, preferably, the micro-protuberances 13 have flat or convex external surfaces, that is, they do not have cavities. In particular, at least the surface of the top 15, which acts as a surface of contact with the eye, is flat or convex.

The micro-protuberances 13 therefore have a micro-pillar configuration, as shown in the drawings. They do not have, for example, an annular shape, with a central cavity that retains a part of the tear film.

According to some embodiments, purely by way of a non-limiting example, some reference manufacturing values are given below as regards the geometry of the micro-protuberances 13 disposed on the contact lens 10.

A height H1, H2, H3 and H4 of each micro-protuberance 13 is comprised, in a non-limiting manner, between 5 μm and 25 μm, preferably and advantageously equal to about 10 μm, given that the maximum thickness of the tear film is indicatively comprised between 8.5 μm and 9.5 μm.

Furthermore, a base diameter D1, D2, D3 and D4 of each micro-protuberance 13 is comprised, in a non-limiting manner, between 5 μm and 255 μm.

In particular, with reference to a hemispherical shape (FIG. 3b) and a cylindrical shape (FIG. 3c), the base diameter D2 and D3 is comprised, in a non-limiting manner, between κ μm and 250 μm, preferably equal to about 50 μm. Finally, with reference to a truncated cone shape (FIG. 3d), the base diameter D4 is comprised, in a non-limiting manner, between 7 μm and 255 μm, preferably equal to about 54 μm.

In addition, with particular reference to FIGS. 3c and 3d, relating to the micro-protuberances with a cylindrical and truncated cone shape, respectively, the top 15 defines a rounded, or convex, surface of contact with the eye. In other words, a curved surface is identified in correspondence with the top 15 of the micro-protuberance 13, which has a radius of curvature Rb3, Rb4 comprised, in a non-limiting manner, between 30 μm and 13,000 μm, preferably equal to about 500 μm.

The conformation of the top 15 is also characterized by the presence of a bevel sm3, sm4 which connects it with the base 14. By way of a non-limiting example, the bevel sm3, sm4 has an angle of inclination with respect to a plane parallel to the base 14 of the micro-protuberance 13 which is comprised between 10° and 50°, preferably being equal to about 25°.

Figure 4:
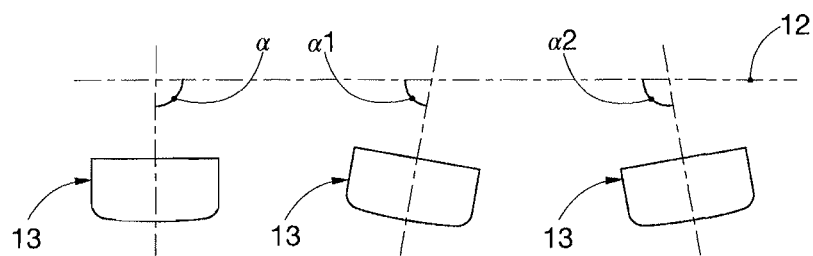
FIG. 4 schematically shows the detail of FIG. 3c in different possible configurations.

According to some embodiments, each micro-protuberance 13 has its own longitudinal axis, which—according to its orientation—defines an angle of inclination α of the micro-protuberance 13 itself, with respect to the surface of the peripheral zone 12 of the contact lens 10 from which it extends (see FIG. 4, in which a cylindrical micro-protuberance is shown by way of a non-limiting example). In particular, this angle of inclination α is comprised, in a non-limiting manner, between α1=80° and α2=100°, preferably it is equal to 90°, a condition in which the axis of the micro-protuberance 13 is perpendicular to the surface of the peripheral zone 12 of the contact lens 10. Please also refer to these three configurations in FIG. 4, in which from left to right the angles α=90°, α1=80° and α2=100° are shown respectively.

In accordance with some embodiments, as a whole, the micro-protuberances 13, geometrically characterized as above, preferably occupy between κ and 50% of the area corresponding to the development of the peripheral zone 12 of the contact lens 10, which extends in the annular crown comprised between the visual diameter Dv and the external diameter De. More preferably, the micro-protuberances 13 occupy about at least 20% of the area corresponding to the development of the peripheral zone 12 of the lens, in particular a portion comprised between 35 and 50% of this area.

In addition, the micro-protuberances 13 are preferentially disposed, within the peripheral zone 12, in an equally and neatly distributed manner, according to a circular and/or ellipsoidal orientation.

Figure 5:
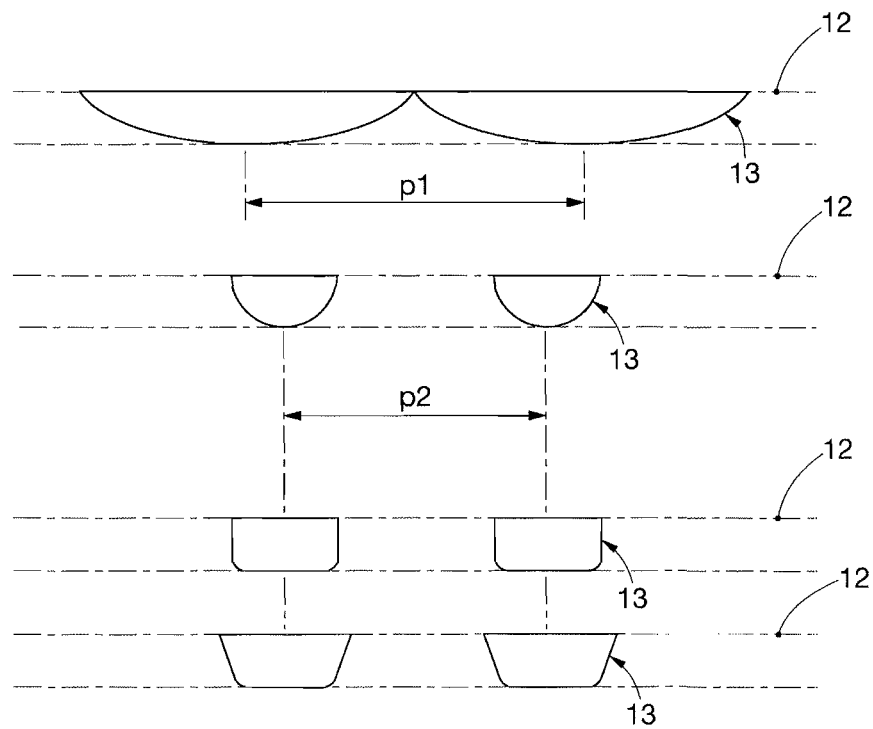
FIG. 5 schematically shows a detail of the contact lens according to different embodiments.

With reference to FIG. 5, in accordance with one example embodiment, two micro-protuberances 13, one immediately next to the other, having a cylindrical and/or truncated cone shape, have a pitch p2 comprised between 30 µm and 500 µm, preferably equal to 100 µm.

With the expression "step" mentioned above, with reference to the embodiments of FIG. 5, we mean the radial distance between the respective centers of the micro-protuberances 13.

Again with reference to FIG. 5, the configurations of the micro-protuberances 13 with a spherical cap shape and pitch p1, and with a hemispherical shape and pitch p2, represent possible, non-preferential embodiments given that the contact surface between the micro-protuberances 13 and the cornea is only punctual, whereby the stability of the contact lens 10 during movement is not optimal. Furthermore, if the micro-protuberance 13 has a spherical cap shape, the hollow space that is created, in the zone outside the visual diameter Dv, between the contact lens 10 and the cornea is considerably limited, compromising an optimal circulation of the tear film.

Advantageously, the material with which the lens is manufactured is selected from those already known in the state of the art and is biocompatible, non-hydrophilized and more preferably with a medium/low surface contact angle, that is, with a medium/high wettability value, in order to create stable bonding forces between corneal epithelium, tear film, lens surface and the walls of the micro-protuberances. In this way, the tear film can distribute itself evenly and stably in the hollow space between the cornea and the lens.

Ultimately, the preferential embodiments, in a non-limiting manner, able to guarantee a feeling of complete comfort for contact lens wearers, are represented by the contact lenses 10 with micro-protuberances 13 having a cylindrical shape (FIG. 3c) and truncated cone shape (FIG. 3d). In fact, by means of these two solutions, ideal conditions of tear exchange and an excellent stability of the contact lens are advantageously obtained, the latter being due to the contact surface formed at the top 15 of the micro-protuberance 13.

With the shape, sizes and disposition of the cylindrical and truncated cone shaped micro-protuberances 13 described above, each contact lens 10 can contain a total number of micro-protuberances 13 comprised, in a non-limiting manner, between 300 and 65,000, preferably between 5,000 and 20,000, more preferably between 8,000 and 15,000.

According to an alternative embodiment, described with reference to FIGS. 1a and 2b, the contact lens 10 comprises, in the peripheral zone 12, outside the visual diameter Dv, a plurality of micro-protuberances 13 and a plurality of holes 16, or micro-holes, made on the surface of the lens in such positions as to be interposed between different micro-protuberances 13 disposed in the vicinity, for example four in FIG. 2b. The contact lens 10 shown in FIG. 1 and in the enlargement of FIG. 1a provides the presence of both the micro-protuberances 13 and also the holes 16. It is however evident that FIG. 1 is also illustrative of a contact lens 10 according to the variant shown in the enlargement of FIG. 2a, without the holes 16, since the size and number of the latter is such as not to modify the general appearance of the lens, even if the lens does not have them.

Figure 2C:
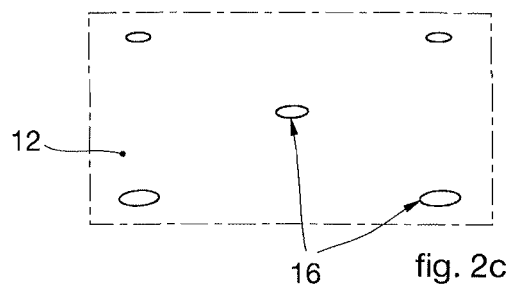

According to another embodiment, not included in the scope of protection of this patent application, schematically shown in the enlargement of FIG. 2c, it is possible to provide a contact lens 10, without micro-protuberances 13, and provided internally with only a plurality of micro-holes 16.

According to other preferred embodiments, the holes 16 are disposed inside the peripheral zone 12, starting from the visual diameter Dv up to the external diameter De.

The holes 16, according to other preferential embodiments, are, in a non-limiting manner, equally and neatly distributed, for example in a radial pattern starting from the center of the lens, or according to a circular and/or ellipsoidal orientation.

The holes 16 are through holes that put the internal surface of the lens 10 in communication with the external surface of the lens 10, intended to be contacted by the eyelid and the tear film.

Advantageously, with the presence of these holes 16 there is obtained an increase in the circulation and exchange effect of the tear fluid and an increase in the oxygenation of the cornea of the eye.

According to some embodiments, the diameter of the holes 16 is comprised, in a non-limiting manner, between 3 µm and 20 µm, preferably equal to about 10 µm.

Consequently, each contact lens 10 with micro-protuberances 13 can contain a total number of holes comprised, in a non-limiting manner, between 100 and 1000, preferably comprised between 400 and 600.

Advantageously, the contact lens 10, with micro-protuberances 13 and/or with holes 16, is manufactured with a biocompatible material, non-hydrophilized and which has, at the same time, excellent characteristics of adaptability to the corneal surface and a medium/low surface contact angle. In particular, a contact lens 10 is obtained with a thickness indicatively comprised between 60 µm and 150 µm, thinner than soft contact lenses (thickness between 100 µm and 200 µm) and RGP contact lenses (thickness between 170 µm and 250 µm).

The characteristics of the material used to produce the contact lenses 10, with micro-protuberances 13 and/or with holes 16, according to the present invention, therefore allow to obtain a contact lens 10 with excellent tolerability, comfortable to wear and hygienic.

In fact, with the presence of micro-protuberances 13, approximately 85% of the natural tearing of the eye is maintained. At the same time, the non-hydrophilized material with which the contact lenses 10 with micro-protuberances 13 are manufactured gives the lens an absence of hydrophilization, eliminating the so-called "sponge effect" and preventing the passage of dirt through its surface. Ultimately, a contact lens 10 is obtained which significantly reduces the risk of infections and which requires simple routine maintenance.

Consequently, the contact lenses 10 with micro-protuberances 13, according to the present invention, allow to eliminate the problems (for example, the reduced level of comfort and risk of infections) which frequently cause a patient to abandon contact lenses as an aid to compensate for sight defects.

It is clear that modifications and/or additions of parts may be made to the contact lens as described heretofore, without departing from the field and scope of the present invention as defined by the claims.

It is also clear that, although the present invention has been described with reference to some specific examples, a person of skill in the art shall certainly be able to achieve many other equivalent forms of contact lens, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. A contact lens (10) made of non-hydrophilized material, wherein it comprises a plurality of micro-protuberances (13) disposed so as to be facing toward the eye, during use, and configured to contact the corneal epithelium so as to raise said lens (10) by a few micrometers with respect to the corneal surface,
wherein an internal zone (11), smooth and facing toward the eye, during use, extends within a visual diameter (Dv) smaller than an external diameter (De) of said contact lens (10),
a peripheral zone (12) is disposed outside the internal zone (11), the peripheral zone (12) being annular in shape and extending between the visual diameter (Dv) and the external diameter (De),
the micro-protuberances (13) are made only in correspondence with said peripheral zone (12),
the micro-protuberances (13) are characterized by a height (H1, H2, H3, H4), which extends from a base (14) toward a top (15), comprised between 5 μm and 25 μm, and
the contact lens (10) contains a total number of micro-protuberances (13), the total number being between 300 and 65,000;
and wherein the micro-protuberances have a micro-pillar configuration, have a base (14) and a top (15), are integrated in a single body with the lens, and have a configuration that is cylindrical, truncated-cone, ellipsoidal, paraboloid or prismatic in shape.

2. The contact lens (10) as in claim 1, wherein each micro-protuberance (13) has a longitudinal axis defining an angle of inclination (a) of the micro-protuberance (13) with respect to the surface of the peripheral zone (12) of the contact lens (10) from which the micro-protuberance (13) extends.

3. The contact lens (10) as in claim 1, wherein the micro-protuberances (13) have a cylindrical or truncated-cone shape, and the contact surface defined by the top (15) is convex-shaped, conformed as a curved surface having a radius of curvature (Rb3, Rb4) comprised between 30 μm and 13,000 μm.

4. The contact lens (10) as in claim 3, wherein said curved surface has a radius of curvature (Rb3, Rb4) equal to about 500 μm.

5. The contact lens (10) as in claim 1, wherein the micro-protuberances (13) include cylindrical-shaped micro-protuberances (13), and the cylindrical-shaped micro-protuberances (13) have a base diameter (D3) comprised between 5 μm and 250 μm.

6. The contact lens (10) as in claim 1, wherein the micro-protuberances (13) include truncated cone-shaped micro-protuberances (13) and cylindrical-shaped micro-protuberances (13) having a base diameter (D4) comprised between 7 μm and 255 μm.

7. The contact lens (10) as in claim 1, wherein the micro-protuberances (13) have a cylindrical or truncated-cone shape, and two micro-protuberances (13), one immediately next to the other, having a cylindrical or truncated-cone shape, have a pitch (p2), understood as the radial distance between their respective centers, comprised between 30 μm and 500 μm.

8. The contact lens (10) as in claim 1, wherein said micro-protuberances (13) are homogeneously distributed over the entire internal surface of said peripheral zone (12), the totality of said micro-protuberances (13) occupying at least 20% of the area corresponding to the development of said peripheral zone (12).

9. The contact lens (10) as in claim 8, wherein the totality of said micro-protuberances (13) occupy a portion comprised between 35% and 50% of the area corresponding to the development of said peripheral zone (12).

10. The contact lens (10) as in claim 1, further comprising within the peripheral zone (12) a plurality of holes (16), having a diameter comprised between 3 μm and 20 μm and being made on the surface of the lens in positions such as to be interposed between different micro-protuberances (13) disposed in the vicinity.

11. The contact lens (10) as in claim 10, wherein the diameter of said plurality of holes (16) is equal to 10 μm.

12. The contact lens (10) as in claim 1, wherein the contact lens has a medium/low surface contact angle, comprised between 10° and 60°.

* * * * *